Figure 1:
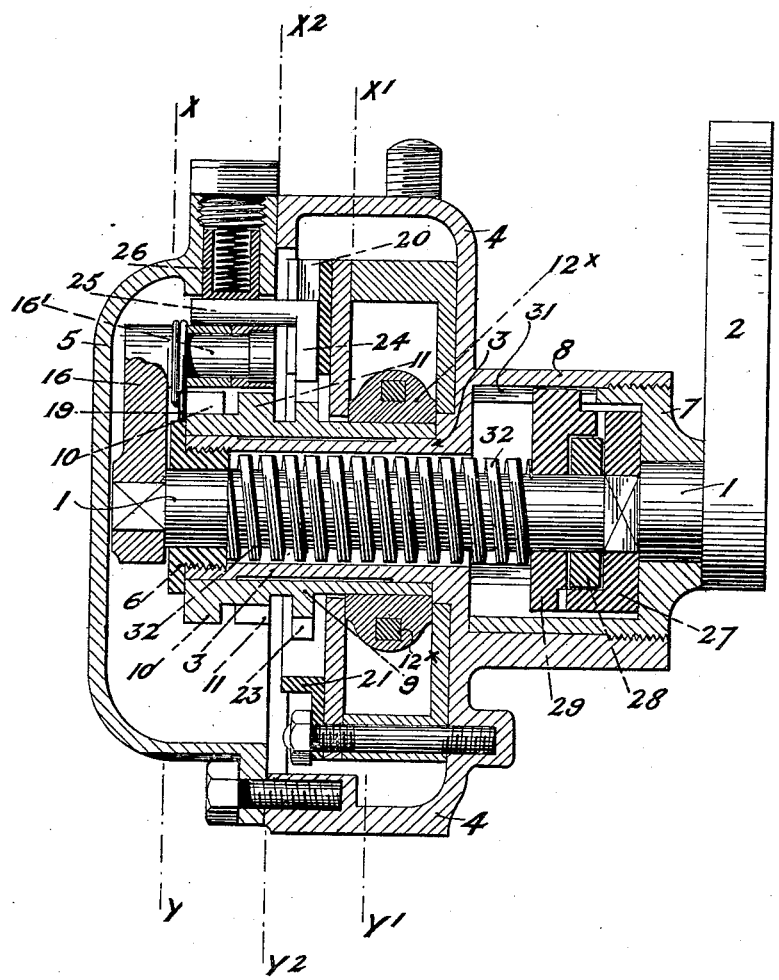

No. 713,992. Patented Nov. 18, 1902.
W. KINGSLAND.
RATCHET OPERATED ELECTRIC SWITCH.
(Application filed Apr. 22, 1902.)

(No Model.) 11 Sheets—Sheet 1.

Witnesses
Chas H Smith

Inventor
William Kingsland
for L. W. Serrell & Son
attys

No. 713,992. Patented Nov. 18, 1902.
W. KINGSLAND.
RATCHET OPERATED ELECTRIC SWITCH.
(Application filed Apr. 22, 1902.)
(No Model.) 11 Sheets—Sheet 2.

FIG: 2.

No. 713,992. Patented Nov. 18, 1902.
W. KINGSLAND.
RATCHET OPERATED ELECTRIC SWITCH.
(Application filed Apr. 22, 1902.)

(No Model.) 11 Sheets—Sheet 3.

No. 713,992. Patented Nov. 18, 1902.
W. KINGSLAND.
RATCHET OPERATED ELECTRIC SWITCH.
(Application filed Apr. 22, 1902.)

(No Model.) 11 Sheets—Sheet 4.

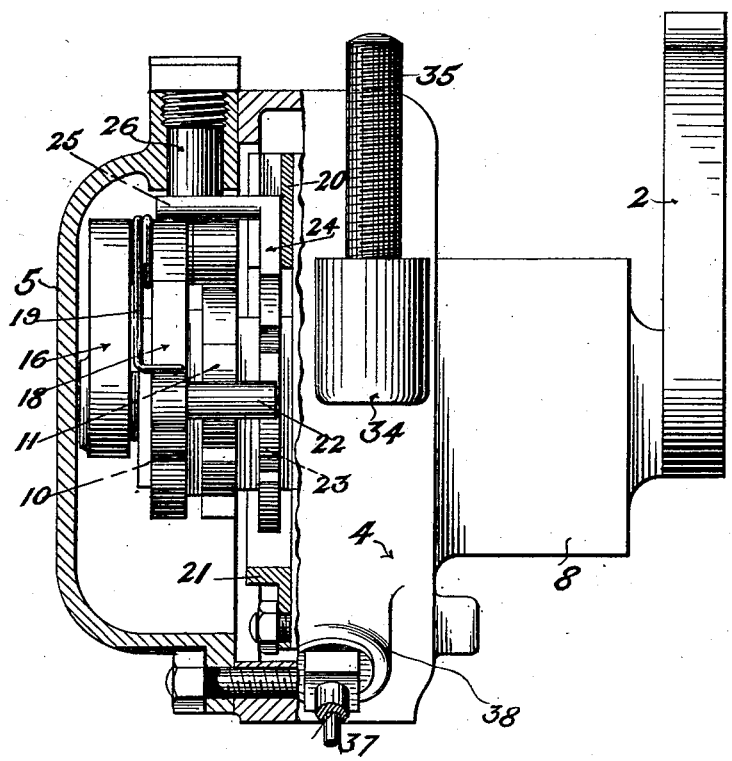

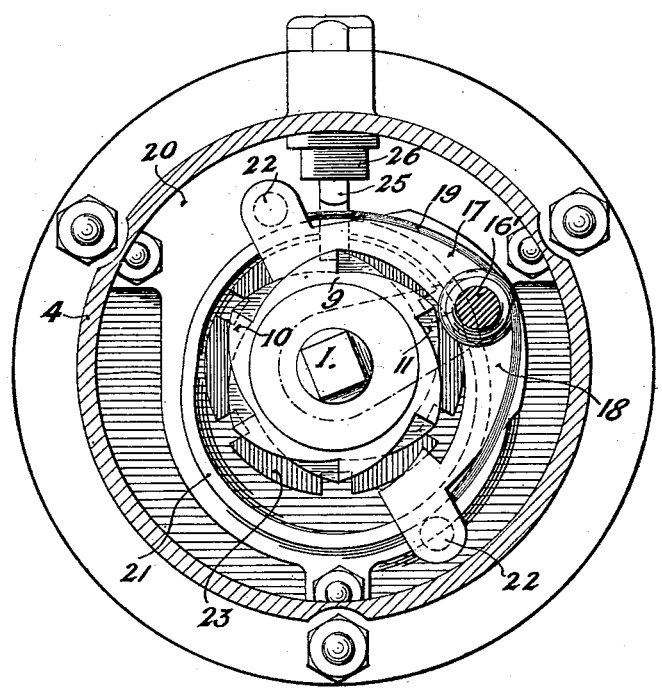

No. 713,992. Patented Nov. 18, 1902.
W. KINGSLAND.
RATCHET OPERATED ELECTRIC SWITCH.
(Application filed Apr. 22, 1902.)
(No Model.) 11 Sheets—Sheet 7.

No. 713,992. Patented Nov. 18, 1902.
W. KINGSLAND.
RATCHET OPERATED ELECTRIC SWITCH.
(Application filed Apr. 22, 1902.)

(No Model.) 11 Sheets—Sheet 8.

No. 713,992. Patented Nov. 18, 1902.
W. KINGSLAND.
RATCHET OPERATED ELECTRIC SWITCH.
(Application filed Apr. 22, 1902.)
(No Model.) 11 Sheets—Sheet 9.
FIG. 12.
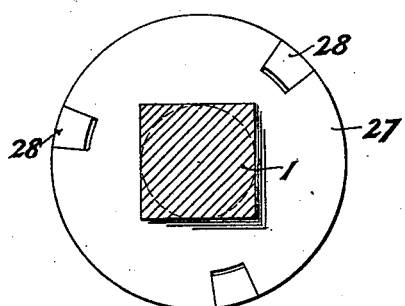
FIG. 11.
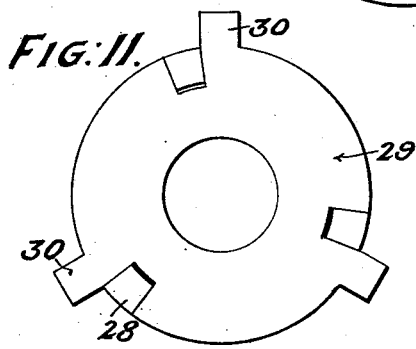
FIG. 10.
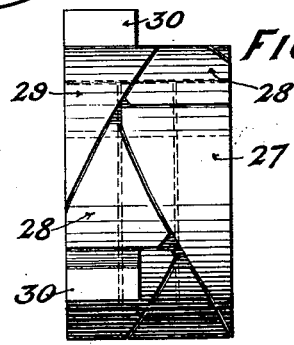
FIG. 15. FIG. 14. FIG. 13.
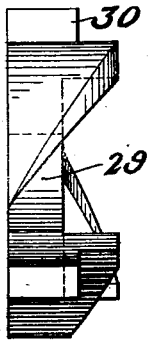 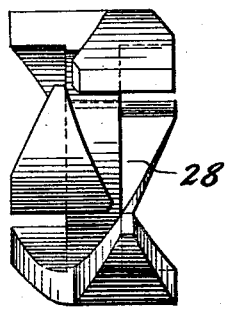 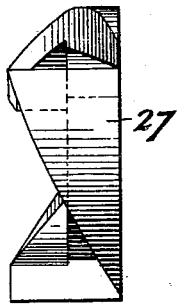
Witnesses
Inventor
William Kingsland

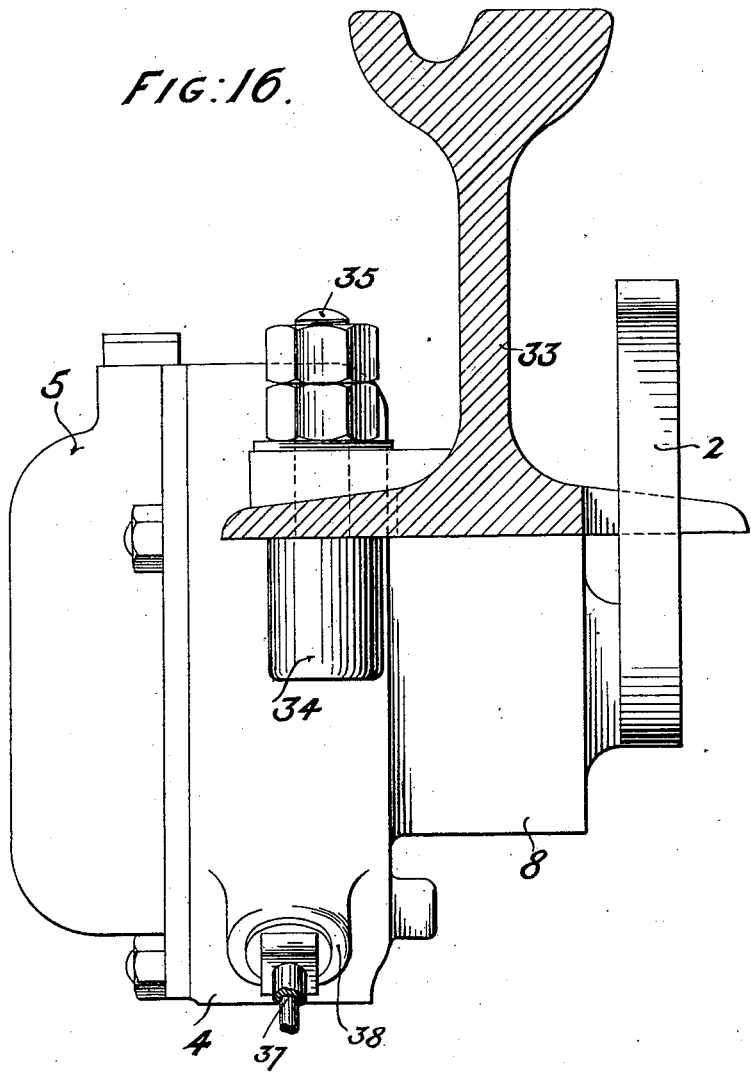

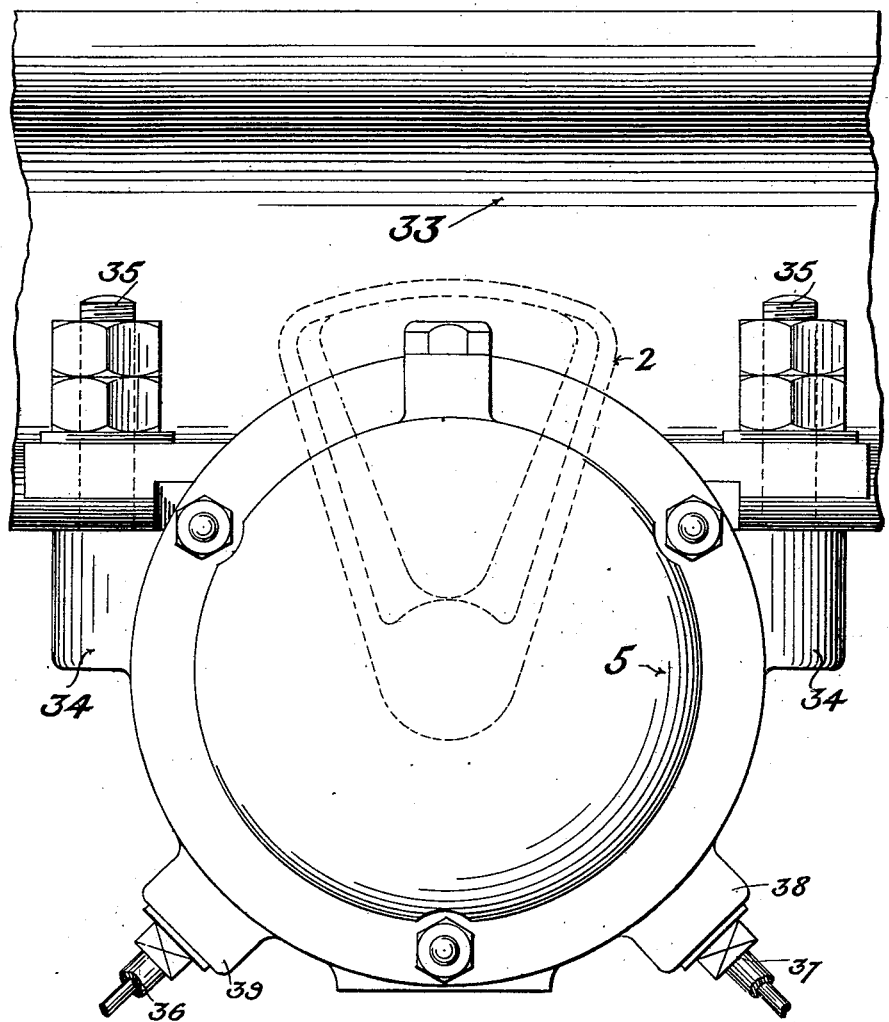

UNITED STATES PATENT OFFICE.

WILLIAM KINGSLAND, OF LONDON, ENGLAND.

RATCHET-OPERATED ELECTRIC SWITCH.

SPECIFICATION forming part of Letters Patent No. 713,992, dated November 18, 1902.

Application filed April 22, 1902. Serial No. 104,179. (No model.)

*To all whom it may concern:*

Be it known that I, WILLIAM KINGSLAND, electrical engineer, a subject of the King of Great Britain, residing at 8 Breams Buildings, Chancery Lane, in the city of London, England, have invented certain new and useful Improvements in Ratchet-Operated Electric Switches, (for which I have made application for patent in Great Britain under No. 19,657 and dated October 2, 1901,) of which the following is a specification.

It is frequently desired to communicate to rotary electric switches uniform step-by-step motions in either forward or backward directions for the purpose of alternately making or breaking an electric circuit or for inserting and cutting out resistances and other like purposes, and this invention refers to such switches, wherein the required motions are effected by connecting the movable rotary member of the switch to an intermittent wheel. This intermittent wheel has two sets of oppositely-sloping ratchet-teeth around its periphery which are operated upon by pawls carried from a spindle, the latter being capable of partial rotation in either direction by an operating lever or wheel operated by tappet action or otherwise.

According to the present invention cam-shaped guides are provided for controlling the position of the acting ends of the pawls relatively to the intermittent wheel, whereby that pawl which for the time being is to be inoperative is held out of engagement, and with such mechanism suitable means are provided for definitely stopping the rotary motion of the intermittent wheel when it has been moved through the required angle of rotation and immediately releasing the same ready for the next operation. Means are also provided for returning the operating-spindle to the normal position and limiting its extent of motion, and a suitable casing is provided for supporting the moving parts.

I will now describe my invention with reference to the accompanying drawings.

Figure 2:
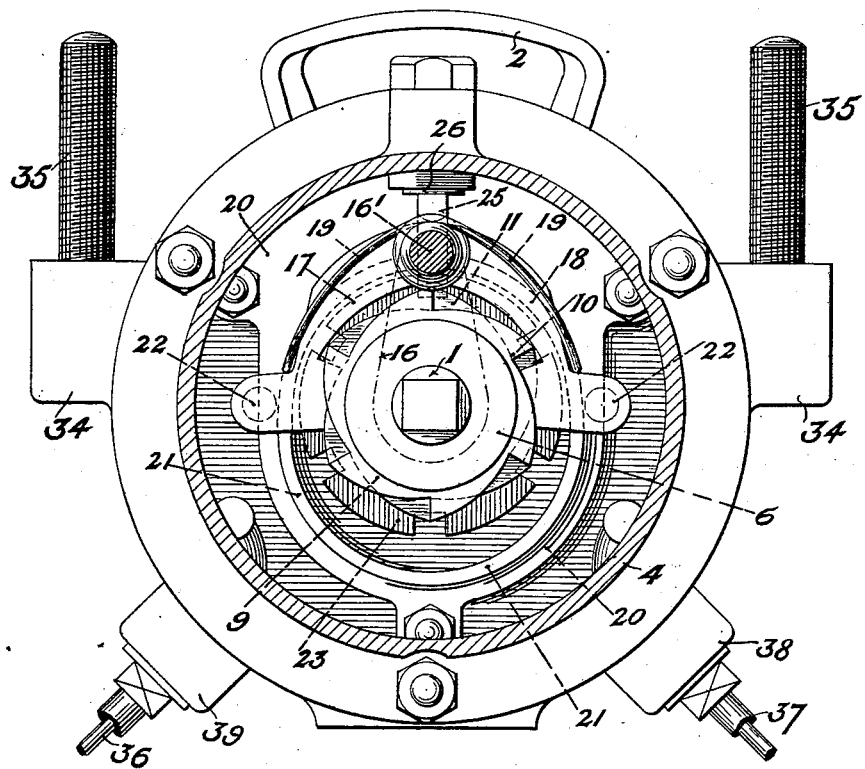
Figure 3:
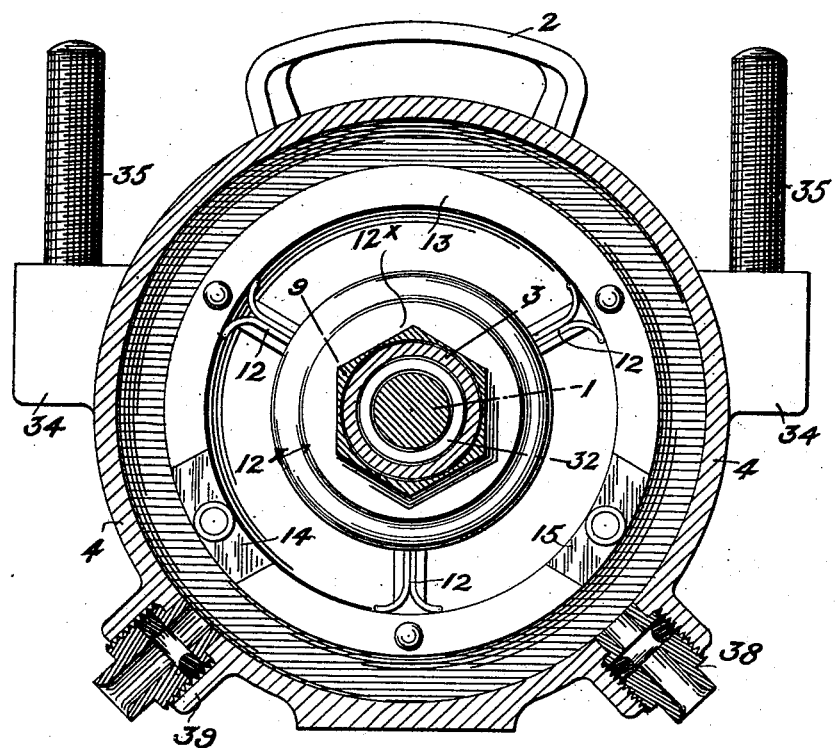
Figure 4:
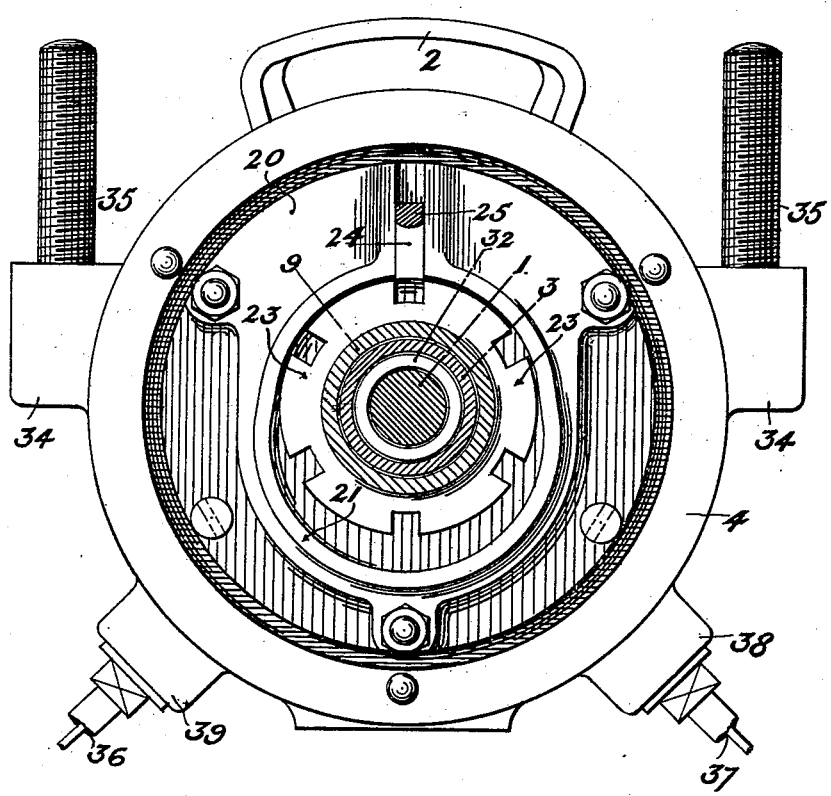
Figure 8:
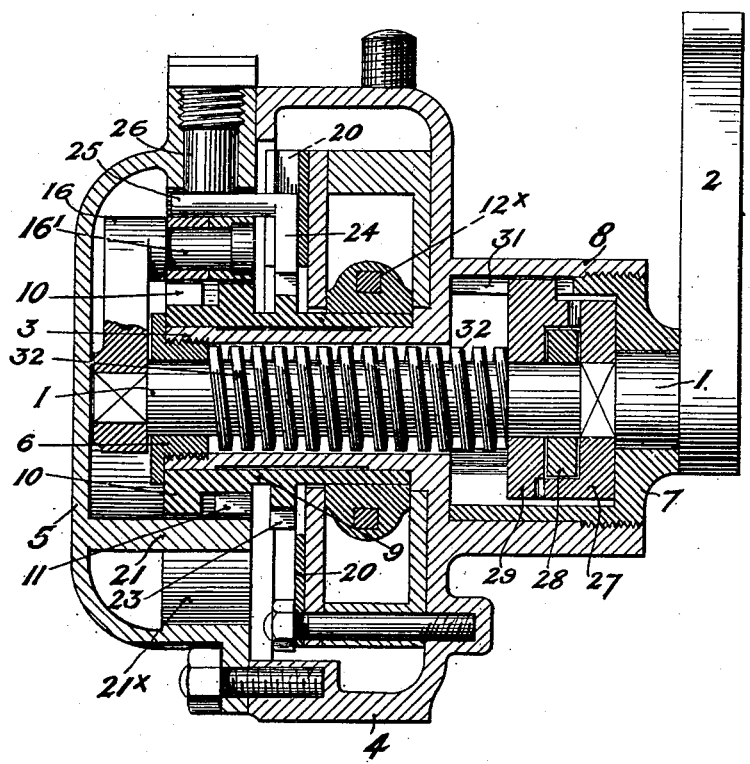
Figure 9:
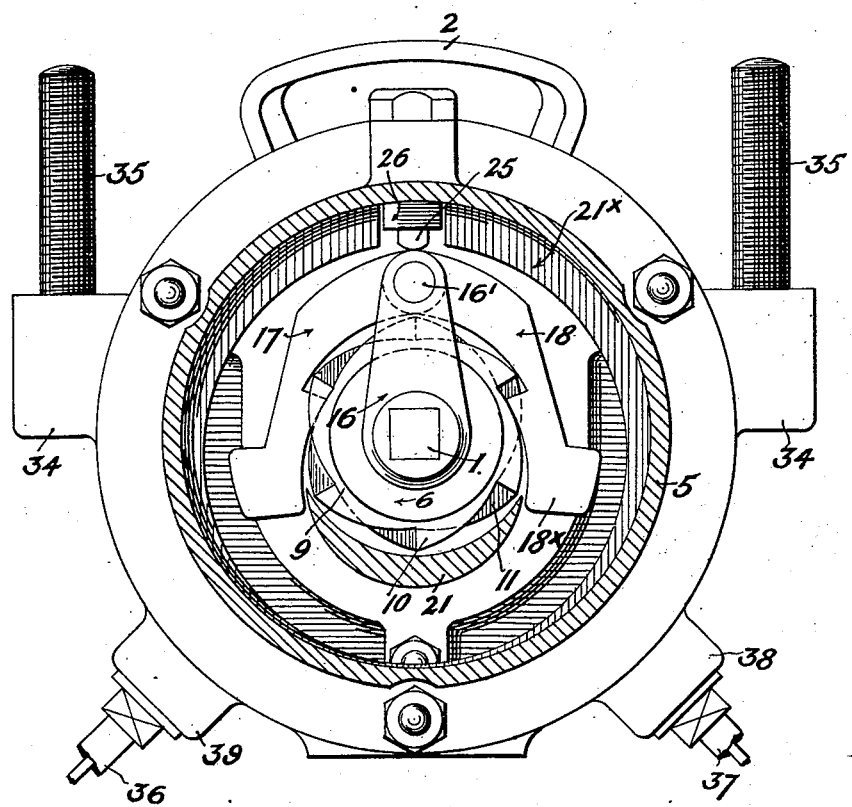

Figure 1 is a vertical longitudinal section of the apparatus constructed according to my invention for alternately making and breaking an electric circuit. Fig. 2 is a transverse section of the apparatus shown at Fig. 1, the section being taken about the line X Y of the latter figure. Fig. 3 is a vertical transverse section on the line X' Y' of Fig. 1 to more particularly show an example of construction of a switch which may be conveniently employed in this apparatus. Fig. 4 is a vertical transverse section on the line $X^2 Y^2$ of Fig. 1 to more particularly show means for locking the step-by-step rotating parts of the device. Fig. 5 illustrates in longitudinal elevation the step-by-step mechanism and locking arrangements, the casing being partly in section in order to expose these parts. Fig. 6 is a view similar to that shown at Fig. 2, but illustrating the step-by-step operating mechanism after operation and just before its return to its normal position. Fig. 7 is an end elevation showing a modified formation of a crank-arm hereinafter mentioned. Fig. 8 is a sectional side elevation of a modified construction of my step-by-step mechanism, and Fig. 9 is a sectional end elevation of the same.

The moving parts of the devices employed in returning the spindle and the operating lever or wheel to its normal position after operation in either direction and for limiting its angular motion are shown detached and on a larger scale than the previous figures at Figs. 10 to 15, Fig. 10 being a side elevation, and Fig. 11 a left-hand end elevation, of three toothed engaging wheels hereinafter described. Fig. 12 is a right-hand end elevation of Fig. 10, showing that end of the spindle in section. Figs. 13, 14, and 15 are side elevations of the three wheels aforesaid detached from one another.

The casing or mounting for the switch and switch mechanism has been shown by sectional views in the figures previously referred to, but the attachment of the case to the rail when employed for electrical traction is shown by Figs. 16 and 17, Fig. 16 being a side elevation of the casing with the rail in transverse section and Fig. 17 being an end elevation of the casing.

In carrying out my invention I provide a spindle 1, carried in bearings and capable of being given a partial rotation in either direction by an arm 2 or equivalent part, such as a wheel, its automatic return to a normal position of rest as well as its extent of rotation being advantageously effected and defined by devices hereinafter described.

The arm 2 or equivalent part may be operated by hand, but the mechanism of the switch is very suitable for being operated by a tappet action, which renders the device eminently applicable for use in electric traction.

Referring more particularly to Figs. 1 to 6, I loosely mount an intermittent wheel 9 upon a bearing formed by a stationary sleeve 3, which surrounds the spindle 1. In the example illustrated this stationary sleeve 3 forms a portion of a casing 4, having a cover 5, which incloses the entire apparatus, and the sleeve 3 at one end carries one of the bearings 6 of the spindle 1, while the opposite end of the spindle is carried by a bearing-collar 7, screwed into an extended portion 8 of the casing. The intermittent wheel 9 has two sets of ratchet-teeth 10 11 formed on its periphery in different planes and sloping in opposite directions, and this wheel 9 is connected either directly or by means of gearing to the movable part of the switch $12^\times$ which is to be operated.

In the present example the wheel 9 has a sleeve part extending beyond the teeth, which extended part is polygonal, Fig. 3, and serves to carry the moving part of the switch $12^\times$ and the switch-brushes 12. (Shown in Fig. 3.) In the construction shown there are three brushes 12 electrically connected and inclosed within a stationary cylinder 13, of insulating material, the latter having two conducting contact plates or surfaces 14 15, to which the conducting cables or wires are attached, and the mechanism is calculated to operate the switch one-sixth of a revolution at each motion, so as to alternately make and break the electric circuit. Obviously, however, the type or construction of the switch may be varied according to requirements.

A crank-arm 16 (indicated by dotted lines, Fig. 2) is fixed to the spindle 1, so as to revolve therewith, and freely carried upon the crank-pin 16' of the arm 16 I provide two pawls 17 18, one being in the plane of one set of ratchet-teeth of the intermittent wheel 9 and the other in the plane of the other set, one or other of these pawls acting to turn the ratchet-wheel, according to the direction in which the operating-arm 2 is moved. Springs, such as 19, may be provided, if desired, to hold the pawls to their work.

On one side of the intermittent wheel 9 and in a parallel plane therewith I provide a stationary plate 20, having cam-shaped guides, such as the cam-shaped projection or bead 21, Figs. 1 and 2. Upon each pawl I provide a projecting pin 22, Figs. 2 and 5, which engages with the cam-guide 21 and controls the position of the inoperative pawl as the pawls are carried around in a circular direction by the crank-arm 16. The cam-guide 21 serves to hold the inoperative pawl out of contact with the teeth and to prevent it engaging on its return motion.

The intermittent wheel 9 and the movable switch part $12^\times$ should be prevented from moving through a greater angle of rotation than is required, and obviously the intermittent wheel may be so prevented by friction upon its bearings or by friction of the switch parts; but I prefer and have obtained more certain results in this direction by providing mechanism which will automatically lock these parts when they have completed their required extent of motion and automatically release them ready for the next operation, and to this end I form notches in a flange 23, fixed to or formed with the intermittent wheel-sleeve.

To coact with the notched flange 23, I provide a locking-bolt 24, sliding radially in grooves formed for it in the stationary guide-plate 20. The bolt 24 has an extended part 25, which is pressed upon by a spring-plunger 26 (carried by the casing) to impel the bolt to its work.

When the parts are in their normal position, the bolt extension 25 rests upon the upper pivoted ends of the pawls 17 18, and the latter pawls are given a cam formation upon their outer surfaces, so that when the spindle is rocked and the pawls are carried around into the position shown at Fig. 6 the bolt extension 25 will be allowed to descend during part of the traverse until the locking-bolt 24 rests upon the circular periphery of the notched flange 23, and at the end of the motion the "cut-away" part of the pawl-surface will be in such a position that it will allow the bolt 24 to snap into the notch of the flange and definitely stop further rotation until the next operation.

During the return of the spindle 1 to its normal position the cam-surface of that pawl which has been the acting pawl will operate upon the bolt extension 25, withdraw the bolt, and free the intermittent wheel.

Obviously instead of forming pawls with surfaces adapted to act upon the extension 25 of the bolt 24 I may prolong the part 25 until it reaches above the crank-arm 16, and then I may make the crank-arm of cam formation, (as illustrated by the end view of this crank shown detached at Fig. 7,) the pawls in such a case being made of ordinary curved formation, as indicated by the dotted lines. By this arrangement of mechanism, as will now be understood, upon the partial rotation of the spindle 1 in one direction one pawl will engage with its own set of teeth on the intermittent wheel and carry the latter with it, while the other pawl will be lifted away from its set of teeth by the cam-guide 21 and the bolt 24 will be allowed to descend onto the periphery of the notched disk, into the next notch of which it will snap when the intermittent wheel has traveled through the requisite angle. Upon the return motion the bolt will be withdrawn, the intermittent wheel released, and during the return motion that pawl which has been inoperative during this action will be again held away from engagement with its set of teeth by the cam-guide 21.

Instead of the cam-guide 21 being carried upon a plate arranged behind the pawl-and-ratchet gear I may, as shown at Figs. 8 and 9, so construct the apparatus that the cam-shaped guide is in the same plane as the pawls, and thereby dispense with the projecting pins 22. In the construction at Figs. 8 and 9 the cam-guide 21 is formed in a piece with the cover 5 of the casing 4, while an additional guide-surface 21$^\times$, also formed with the cover, surrounds the pawls. By this arrangement when the crank-arm 16, Fig. 9, is turned clockwise the pawl 17 will engage its ratchet-teeth, and the other pawl 18, (which in this case is the inoperative pawl,) will be supported by its head 18$^\times$ upon the cam-surface 21$^\times$ and is prevented from engaging its ratchet-teeth in the return motion by the cam-guide 21, as in the previous construction. The upper part of the cam-surface 21$^\times$ prevents that pawl which has been operative from being thrown upward off the ratchet-teeth during a rapid return motion.

I will now describe the means I adopt for causing the automatic return of the operating-spindle to its normal position of rest at the termination of each operation in either direction, such devices serving also to limit the angle of rotation of the spindle 1.

Upon a squared portion of the spindle 1, Fig. 1, and within the stationary portion 8 of the casing I fix a wheel 27, (see Figs. 10, 12, and 13,) formed on one face with ratchet-like teeth, the inclined faces of the teeth being made as portions of screw-threads. These teeth engage with similar oppositely-formed teeth upon an intermediate wheel 28, and the latter wheel 28 is loosely mounted on the spindle 1. (See also Figs. 10 and 14.) The intermediate wheel 28 upon its opposite face is formed with another set of ratchet-like teeth sloping in a direction opposite to the direction of the teeth of the wheel 27, and these opposite teeth of the intermediate wheel 28 engage a wheel 29, (see Figs. 10, 11, and 15,) also loose on the shaft, but prevented from revolution by projections 30, which enter longitudinal grooves 31 in the circumference of the bearing-collar 7 or in the portion 8 of the stationary casing or framework of the device. Around the spindle 1 I fit a helical spring 32, which presses upon the toothed wheel 29. Upon the spindle 1, together with its toothed wheel 27, receiving rotative motion in one direction, the teeth of the wheel 27 will exert a screw-like action upon the teeth of the intermediate wheel 28. The latter wheel 28 is, however, incapable of rotative motion in this direction, because it is locked by its opposite teeth to the wheel 29, and the latter is only capable of longitudinal motion. Consequently the intermediate wheel 28 and the wheel 29 receive motion in a longitudinal direction until the wheel 29 reaches the end of the grooves 31 in the stationary case 8 and is prevented from further motion. Up to this point the teeth on the wheel 27 have not turned through a sufficient angle to come quite to the ends of the opposing teeth of the wheel 28, and consequently when the longitudinal motion of the wheel 29 terminates the spindle is brought to a definite stop after having moved through a definite angle, decided by the longitudinal distance through which the wheel 29 has been allowed to move. All this motion of the wheel 29 has taken place against the action of the spring 32, and the return or recoil of this spring reverses the action of the parts and brings the spindle 1 to its normal position of rest. If the spindle 1 is turned in the opposite direction, the action is the same as before stated, the only difference being that the wheel 27 carries with it in its partial rotation the intermediate wheel 28, and it is in this case the opposite teeth of the wheel 28 which gives the wheel 29 its longitudinal motion.

Referring to Figs. 1, 8, 16, and 17, my improved casing for the switch and mechanism consists of a box part 4, formed with a sleeve 3 to carry one bearing of the spindle 1 and the intermittent wheel 9, this box 4 being open at its end, to which the cover 5, carrying the spring-plunger 26, can be applied, while from the other side of the box 4 there projects the casing 8 to contain the mechanism for limiting the motion of the spindle 1 and to carry the bearing 7 for its outer end. The electric cable conductors 36 37 pass into the casing by way of the glands 38 39. With such a casing when the same is to be arranged in connection with the track-rails 33, Figs. 16 and 17, for electric traction lugs 34 are formed on the exterior of the box 4, and bolts 35 extend from the lugs 34 and pass through the flange of the rail 33, whereby the switch-case 4 is securely carried by the rail, and the extension 8 passes beneath the rail, a portion of the flange of the rail on each side being cut away to accommodate the switch-case and to allow for the motion of the operating-arm 2. By this construction of case I am able to inclose the entire mechanism in a water-tight manner, while at the same time the operating-shaft and the mechanism for limiting its motion can be removed without disarranging the switch mechanism, or the switch can be removed, if desired. The cover 5 of the case can be readily removed to inspect the parts, and by fastening the case to the foot of the rail in this manner the distance between the tread of the rail and the operating-arm 2 is not subject to variations, which are likely to occur when a switch-containing case is mounted independently of the rail.

What I claim as my invention, and desire to secure by Letters Patent, is—

1. In electric switches having step-by-step motions, the combination with a spindle, an operating-lever fixed on the spindle for partly rotating the same in either direction from a normal position of rest, an intermittent wheel revoluble on bearings, two sets of ratchet-teeth in different planes and sloping in opposite directions upon the periphery of the intermittent wheel, and an electric switch the movable rotary member of which is connected to the intermittent wheel; of a crank-pin carried from the spindle, two separate oppositely-engaging pawls suspended from the crank-pin to coact with the teeth of the intermittent wheel, a stationary cam-guide with which one or other of the pawls engage according to the direction in which they are moved by the spindle, whereby the inoperative pawl is held away from the ratchet-teeth, means for stopping further rotative motion of the intermittent wheel at the termination of the pawl action, means for limiting the motion of the spindle in either direction and returning the same to its normal position of rest, and a casing for supporting and inclosing the mechanism, substantially as described.

2. In electric switches having step-by-step motions the combination with a spindle, an operating-lever fixed on the spindle for partly rotating the same in either direction from a normal position of rest, an intermittent wheel revoluble on bearings, two sets of ratchet-teeth in different planes and sloping in opposite directions upon the periphery of the intermittent wheel, and an electric switch the movable rotary member of which is connected to the intermittent wheel; of a crank-pin carried from the spindle, two separate oppositely-engaging pawls suspended from the crank-pin to coact with the teeth of the intermittent wheel, a stationary cam-guide to guide one or other of the pawls out of engagement with the ratchet-teeth according to the direction of the motion the pawls receive from the spindle, a radial guide in the casing of the apparatus, a sliding bolt in the guide, a notched disk connected to the intermittent wheel, a spring to cause the sliding bolt to enter one of the notches in the disk to stop further rotative motion of the intermittent wheel, and a cam-surface carried by the spindle to raise the bolt from the notched disk, and to normally retain it out of operation when the spindle is in its position of rest, means for limiting the motion of the spindle in either direction and returning the same to its normal position of rest, and a casing for supporting and inclosing the mechanism, substantially as described.

3. In electric switches having step-by-step motions, the combination with a spindle, an operating-lever fixed on the spindle for partly rotating the same in either direction from a normal position of rest, an intermittent wheel revoluble on bearings, two sets of ratchet-teeth in different planes and sloping in opposite directions upon the periphery of the intermittent wheel, and an electric switch the movable rotary member of which is connected to the intermittent wheel; of a crank-pin carried from the spindle, two separate oppositely-engaging pawls suspended from the crank-pin to coact with the teeth of the intermittent wheel, a stationary cam-guide to guide one or other of the pawls out of engagement with the ratchet-teeth according to the direction of the motion the pawls receive from the spindle, a radial guide in the casing of the apparatus, a sliding bolt in the guide, a notched disk connected to the intermittent wheel, a spring to cause the sliding bolt to enter one of the notches in the disk to stop further rotative motion of the intermittent wheel, and a cam-surface carried by the spindle to raise the bolt from the notched disk, and to normally retain it out of operation when the spindle is in its position of rest, a wheel fixed on the spindle and having inclined ratchet-like teeth upon one face, an intermediate wheel loose on the spindle and having inclined face-teeth to engage with the teeth of the spindle-wheel, oppositely-inclined teeth on the other face of the intermediate wheel, a third wheel loose on the shaft and having teeth to engage the adjacent teeth of the intermediate wheel, means for preventing revolution of the third wheel and for limiting its lateral motion in order to define the angular movements of the spindle, and a spring tending to hold the toothed wheels in engagement with one another and to thereby return the spindle to a normal position of rest after each operation, and a casing for supporting and inclosing the mechanism, substantially as described.

4. In electric switches having step-by-step motions, the combination with a spindle, an operating-lever fixed on the spindle for partly rotating the same in either direction from a normal position of rest, an intermittent wheel revoluble on bearings, two sets of ratchet-teeth in different planes and sloping in opposite directions upon the periphery of the intermittent wheel, and an electric switch the movable rotary member of which is connected to the intermittent wheel; of a crank-pin carried from the spindle, two separate oppositely-engaging pawls suspended from the crank-pin to coact with the teeth of the intermittent wheel, a stationary cam-guide to guide one or other of the pawls out of engagement with the ratchet-teeth according to the direction of the motion the pawls receive from the spindle, a radial guide in the casing of the apparatus, a sliding bolt in the guide, a notched disk connected to the intermittent wheel, a spring to cause the sliding bolt to enter one of the notches in the disk to stop further rotative motion of the intermittent wheel, and a cam-surface carried by the spindle to raise the bolt from the notched disk, and to normally retain it out of operation when the spindle is in its position of rest, a wheel fixed on the spindle and having inclined ratchet-like teeth upon one face, an intermediate wheel loose on the spindle and having inclined face-teeth to engage with the teeth of the spindle-wheel, oppositely-inclined teeth on the other face of the intermediate wheel, a third wheel loose on the shaft and having teeth to engage the teeth of the intermediate wheel, means for preventing revolution of the third wheel and for limiting its lateral motion in order to define the angular movements of the spindle, a spring tending to hold the toothed wheels in engagement with one another and to thereby return the spindle to a normal position of rest after each operation, and a casing for containing the mechanism consisting of a box-like part open at one side, a cover to close the open side, an interior tubular sleeve extending from the wall of the box-like part upon which sleeve the intermittent wheel and movable switch part is carried, a bearing in the interior of the sleeve to support one end of the spindle which passes therethrough, an exterior-extending casing on the outer wall of the box-like part to contain the mechanism for returning the spindle to position and limiting its motion, a bearing carried by the extension to support the outer end of the spindle, and lugs on the box-like part for attachment to a track-rail in electrical traction, substantially as described.

5. In electric switches having step-by-step motions, the combination with a spindle, an operating-lever fixed on the spindle for partly rotating the same in either direction from a normal position of rest, an intermittent wheel revoluble on bearings, two sets of ratchet-teeth in different planes and sloping in opposite directions upon the periphery of the intermittent wheel, and an electric switch the movable rotary member of which is connected to the intermittent wheel; of a crank-pin carried from the spindle, two separate oppositely-engaging pawls suspended from the crank-pin to coact with the teeth of the intermittent wheel, a stationary cam-guide to guide one or other of the pawls out of engagement with the ratchet-teeth according to the direction of the motion the pawls receive from the spindle, means for stopping further rotative motion of the intermittent wheel at the termination of the pawl action, a wheel fixed on the spindle and having inclined ratchet-like teeth upon one face, an intermediate wheel loose on the spindle and having inclined face-teeth to engage with the teeth of the spindle-wheel, oppositely-inclined teeth on the other face of the intermediate wheel, a third wheel loose on the shaft and having teeth to engage the adjacent teeth of the intermediate wheel, projections on the periphery of the third wheel and grooves in the stationary casing of the mechanism with which the said projections engage for limiting the lateral motion of the third wheel in order to define the angular movements of the spindle, and a helical spring located around the spindle and acting to hold the toothed wheels in lateral engagement with one another to return the said wheels and consequently the spindle to a normal position of rest after each operation, and a casing for supporting and inclosing the mechanism, substantially as described.

6. In electric switches having step-by-step motions, the combination with a spindle, an operating-lever fixed on the spindle for partly rotating the same in either direction from a normal position of rest, an intermittent wheel revoluble on bearings, two sets of ratchet-teeth in different planes and sloping in opposite directions upon the periphery of the intermittent wheel, a sleeve extending from the intermittent wheel, an electric switch, a stationary casing to carry the fixed part of the switch, and a rotary member of the switch fixed upon the sleeve of the intermittent wheel; of a crank-pin carried from the spindle, two separate oppositely-engaging pawls freely suspended from the crank-pin to coact with the teeth of the intermittent wheel, a stationary cam-guide surrounding the pawls, a projection on each pawl to engage with the cam-guides, whereby the inoperative pawl is held away from the ratchet-teeth, means for stopping further rotative motion of the intermittent wheel at the termination of the pawl action, means for limiting the motion of the spindle in either direction and returning the same to its normal position of rest, a casing for supporting and inclosing the mechanism, and means for attaching the casing to the track-rail in electrical traction, substantially as described.

WILLIAM KINGSLAND.

Witnesses:
WALTER J. SKERTEN,
WILLIAM W. MARSHALL.